United States Patent
Hughes et al.

(10) Patent No.: US 8,088,184 B2
(45) Date of Patent: Jan. 3, 2012

(54) HIGH FLASH POINT ADDITIVES FOR TREATING CARBON-BASED FUELS

(75) Inventors: Mark D. Hughes, Montgomery, TX (US); Daniel T. Smith, Montgomery, TX (US); Kenneth W. Koch, Manchester, MO (US); Nathaniel Smoter, Cypress, TX (US)

(73) Assignee: Envirochem Solutions LLC

( * ) Notice: Subject to any disclaimer, the term of this patent is extended or adjusted under 35 U.S.C. 154(b) by 426 days.

(21) Appl. No.: 12/240,993

(22) Filed: Sep. 29, 2008

(65) Prior Publication Data
US 2010/0077653 A1    Apr. 1, 2010

(51) Int. Cl.
*C10L 1/18* (2006.01)

(52) U.S. Cl. .............. 44/354; 44/363; 44/385; 44/457
(58) Field of Classification Search .......... 44/385, 44/457, 354, 363
See application file for complete search history.

(56) References Cited

U.S. PATENT DOCUMENTS

| | | | | |
|---|---|---|---|---|
| 3,501,279 A | * | 3/1970 | Allen et al. | 44/385 |
| 7,524,340 B2 | * | 4/2009 | May | 44/457 |

* cited by examiner

*Primary Examiner* — Cephia D Toomer
(74) *Attorney, Agent, or Firm* — Robert W Strozier

(57) ABSTRACT

A simple method is disclosed to produce oil soluble nano particle size additives with significantly higher flash points to improve the safety aspects of these products especially when used in, around, and near high temperature combustion equipment.

17 Claims, 2 Drawing Sheets

HIGH FLASH POINT ADDITIVES FOR TREATING CARBON-BASED FUELS

BACKGROUND OF THE INVENTION

1. Field of the Invention

The present invention relates generally to a high flash point composition and a safe method for treating fuel-burning boilers to control emissions and deposits.

More particularly, a high flash point composition and a safe method for treating fuel-burning boilers to control emissions, where the composition comprises a high flash point liquid including oil-soluble nano-particle size additive particles for fuel such as coal to reduce emissions and deposits.

2. Description of the Related Art

In the generation of electricity the often preferred fuel is natural gas. Natural gas is preferred because it contains very few if any contaminants. Contaminants often cause problems in the power generating industry. Some of these problems result from deposits that accumulate on heat transfer surfaces in boilers, the moving blades in gas turbines, or the moving pistons and valves in diesel engines. These deposits reduce the effectiveness of these units and thereby increase the need to combust additional fuel to compensate for the loss in effectiveness. Other problems encountered are the production of environmental contaminants in the exhaust of these units such as $SO_x$, $S_xO_y$, $NO_x$, $N_xO_y$, and heavy metals that are often discharged to the environment when adequate treatment is not possible.

In the absence of relatively scarce and valuable natural gas, electric utilities are often forced to rely on less environmentally friendly fuels. These fuels may be derivatives of petroleum taken from various stages of the refining process of this increasingly expensive commodity. When price per unit of derived energy is considered, the chosen fuel is frequently coal when it is available as a viable option. Of all the fuels coal has by far the greatest number and largest amounts of contaminants and thus has the greatest environmental impact when not properly and completely treated.

To solve various aspects of treating oil and coal in power generation the metal elements magnesium, calcium, iron, manganese, sodium, potassium, zinc, cerium, barium, silicon, aluminum, chromium, cobalt, nickel, and copper have been tested. Many of these materials have consequently been used as active metal additives for many and varied uses in fired equipment such as boilers, gas turbines, and diesel engines. For ease of handling, these elements are often applied as liquid formulations. For years, crude slurry formulations have reigned supreme in boiler treating. More recently, oil soluble formulations with nano-sized particles have become increasingly more common as their value has been seen in boiler treating. In many of these applications, the "liquid" additive is simply injected into the fuel being used at locations that are remote from the combustion equipment. In other applications it may be necessary that the "liquid" fuel additive is sited and injected near the combustion equipment. As a result it has become customary for minimum flash point specifications to be placed on these various additive formulations. Higher flash points are more desirable, but it has previously been thought that the additional cost or resulting degradation of product properties to achieve that goal is not warranted.

From this point on the flash point of a liquid fuel will be defined as lowest temperature at which it can form a mixture that is ignitable in air due to increased vapor pressure. Once the source of ignition is removed, the vapor of the liquid will stop burning. This is sometimes confused with autoignition temperature which is the lowest possible temperature at which the fuel liquid will spontaneously ignite under STP conditions without an external source to supply the activation energy needed to combust.

Even with the hazards associated with most of these "liquid" formulations, the problems the additives are known to solve have made the dangers acceptable under some conditions. Many of these materials containing the elements mentioned above find many uses in solving power plant problems. Each has its place in the pantheon of fuel treatment to provide the most effective combustion of the various fuels with minimal contribution to world-wide pollution.

Alkaline compounds (magnesium and calcium in particular) have been used since the early $20^{th}$ Century for treating fuel combustion problems, specifically in steam boilers. The problems being treated were caused principally by iron, potassium, sodium, sulfur, and/or vanadium contaminants existing in the fuel, whether the fuel was coal or oil. The compounds used for this treatment have traditionally been calcium and magnesium oxide and/or hydroxide both in powder form and/or as oil dispersed slurries. These slurry materials often caused more difficulties than they solved due to product problems. Because of product settling, shipping containers needed to be mixed before use; storage tanks needed to be constantly circulated to avoid subsequent product settling; pumps or blowers used to feed the material often wore out from product-caused erosion. Large product excesses were specified and required to effect treatment because of large product particles. Even with all these inadequacies these products have been used for many years mainly because they were regarded as inexpensive.

Another use of calcium and particularly magnesium oxide is in preventing sulfur-caused problems in boilers. Sulfur contained in the typical fuels for this application will convert to sulfur dioxide during combustion. A portion of this sulfur dioxide continues to oxidize with additional oxygen to form sulfur trioxide. Upon cooling, sulfur trioxide combines with water vapor—also formed during combustion—to form corrosive sulfuric acid. While still in combustion equipment, this acid readily corrodes iron. After exhausting combustion equipment, this acid is a major source of acid rain. The chemical process to convert sulfur to sulfur trioxide from sulfur dioxide requires a catalyst for conversion—typically hot metal surfaces. Magnesium oxide has been shown to interfere with this catalyst action by passivating hot metal surfaces that normally act as these catalysts. As an added benefit, magnesium oxide also interacts with sulfur trioxide or sulfuric acid that may still form to neutralize them. Thus the use of magnesium compositions in combustion equipment reduces operator problems with corrosion and also helps the environment.

Calcium has been used chiefly to remove sulfur oxides from flue gases by the formation of thermally stable calcium sulfate. In this role the calcium solids have often been added just before the economizer. Often calcium has been used in the form of either ground limestone or lime, often associated with petroleum distillates to assist handling.

Iron compounds have also been used in boilers to reduce the amount of unburned carbon. Iron has a catalytic effect. Molecules of hydrocarbon and oxygen can combine more readily on surfaces of iron atoms to produce the desired carbon dioxide and water vapor of combustion. Freshly prepared, small particle iron—and iron oxides—have been found to be particularly effective for this catalyst effect. Iron for this purpose has typically been added on the coal in less effective forms. Oil-soluble iron formulations have been used in petroleum applications with positive effects. Other metallic elements have also been used to treat these various combustion and contaminant problems. For example, manganese, cerium, and barium have all been used as combustion improvers alone and in combination with each other and other metal elements. Zinc, silicon, aluminum, and copper have been used to modify and eliminate deposits.

In short, many different elements have been used quite effectively for many years to protect power generating equipment and to obtain maximum output of electricity from each unit of fuel.

In most cases the treating elements have been delivered in liquid form. This form may be as simple as a solid dispersed into an oil carrier for ease of handling or as complex as a true oil-soluble material to provide the smallest possible particle size (nanometer-sized), with the largest possible surface area to facilitate reactions in the combustion zone of a steam boiler, gas turbine, or diesel engine.

In nearly every application, it is imperative to obtain the best possible dispersion of the chosen element into the fuel. With liquid fuels, this has been as simple as injecting the additive into the fuel prior to combustion. With coal, the optimum treatment may be spraying onto the coal as it is moves on the converyor belt prior to passage through any pulverizers in the system or spraying into the boiler itself. In either case, because low flash liquids have been used, attention needs to be paid to the physical location of the additive storage container, additive pumps used to deliver the additive of choice, and the environment around the coal after treatment. Hazardous conditions may be caused by lower flash point additives.

Some common solvents used with fuel additives are listed in Table 1.

TABLE 1

Common Solvent Flash Points for Fuel Additives

| Solvent | Flash Point |
| --- | --- |
| Aromatic | 65° C. |
| #2 Diesel | 52° C. |
| #4 Diesel | 54° C. |
| #1 Fuel Oil | 38° C.-72° C. |
| #2 Fuel Oil | 52° C.-96° C. |
| #4 Fuel Oil | 61° C.-116° C. |

Fuel oils of higher number (#5 or #6) become too viscous to be considered as solvents for additives. This increased viscosity would simply exchange problems—low flash with difficulties in handling. The aromatic solvent shown would be a typical additive solvent that currently meets all flash point requirements for power plant applications. For solvents, these distinct physical properties typically exhibit the following trend: flash point<autoignition temperature.

The minimum 65° C. flash point is as much a requirement of the transportation industry as it is the power plant. To qualify for a combustible label instead of a flammable label, a product must have a minimum 65° C. flash point. Lower flash point materials make over-the-road tankers and trucks filled with drums of material more hazardous. The recognition of the increased hazards normally raises the cost to ship lower flash point products. Similarly, higher flash point materials will often carry significantly reduced shipping costs.

The primary additive form for many years to deliver the major treating element, magnesium, has been either as a fuel-oil-dispersed slurry of magnesium oxide or a water slurry of magnesium hydroxide. Similarly other metals have been delivered to the power plant as fuel-oil-dispersed slurries. These materials have all suffered from the major drawback of the slurry technology—relatively large sizes. A paradigm shift has been occurring during the past 10 or so years as the benefit of small—in fact nanosized particles—have become better known for fuel treatment. For example in treating boilers with a magnesium oxide slurry it has been established that for each part of contaminant present in an oil fuel, one part of magnesium from the slurry is required to achieve adequate treatment. Many of these slurry products will contain magnesium oxide particles in the one micron range (1μ, 1 μm, 1,000 nanometers). Conversely, using additives that contain nanosized particles—in every case a liquid, oil-soluble formulation—it has been demonstrated that only 0.2 parts of magnesium is required to adequately treat one part of contaminants. In some side-by-side tests, it has been found that even less might be possible.

The improvement in treating effectiveness is due to the increase of active surface atoms as the size of a particle decreases. For example, for a 10 nanometer particle of magnesia only 10% of the active atoms are located at the surface while for a 3 nanometer particle the number of active atoms located at the surface of the particle increases to 50%. See, e.g., "The Chemistry and Technology of Magnesia," Mark Shand; Wiley Interscience: 2006. This relationship between size and active surface particles becomes very important, since many of the reactions that occur in boiler treating rely on surface activity of the particles. This theme is echoed in the EPA White Paper on Nanotechnology (EPA 100/B-07/001 February 2007). Other industry studies have also demonstrated that smaller particles allow for more effective treatment.

This has two immediate benefits to the power plant operator: 1) less material can be used to treat the same amount of fuel and 2) less ash waste is produced that requires disposal. Unreacted magnesium ends up in the ash pits in a boiler and is eventually hauled off to landfill or other disposal.

The chief benefit of slurry technology has always been assumed to be low cost. To maintain this low cost, only inexpensive solvent can be used. These tend to have the lower flash points as seen in Table 1. With the reduction in treating rates possible with the emerging oil soluble, nanoparticle technologies, however, many solvent choices are available.

A review of regulations for flash points and the hazards created by lower flash points demonstrates the value of higher flash point materials—especially during shipping over the road and in power plant usage. For example, the U.S. Department of Labor, Occupational Safety and Health Administration states under physical hazards that: "A chemical is a physical hazard if it: is likely to burn or support fire." This same Hazard Communication Standard continues by stating that:

Flashpoint is the primary measure of a liquid chemical's propensity to burn. The only difference between a "flammable" and "combustible" liquid is the relative ease (temperature) with which the substance burns or supports burning. The assignment to combustible or flammable liquid categories is quite simple: if the flashpoint is between 37.8° C. and 93.3° C., it is a combustible liquid; if the flashpoint is below 38° C., it is a flammable liquid.

The Canadian equivalent of OHSA concurs both in their assessment of the hazards of low flash point liquids and in the distinction between flammable and combustible.

The National Fire Protection Association in the U.S. has made their placement of fire hazard obviously the most important of the four classifications on their NFPA placards. Fire hazard is the red box and is located at the top of the four box square. They differentiate fire hazards on a scale of 0 to 4 where 0 means the chemical will not burn and 4 assigns a flash point below 23° C. This theme is repeated in the California Code of Regulations, Title 8, Section 5194 on Hazardous Substances and Processes.

In summary, it appears that many regulating bodies recognize the importance of higher flash point liquids and have defined the range of flash points, but the application of high flash point liquids to additives has not been available.

"Mechanisms and Techniques for the MgO Treatment of Coal-Fired Utility Boilers," A. S. Dainoff and H. N. Schenck, presented at the Engineering Foundation Conference on Fouling and Slagging from Impurities in Combustion Gases, Copper Mt., Colo., Jul. 29-Aug. 3, 1984, provides a historical account of flue gas conditioning using magnesium in coal-fired plants.

WO/2007/053786 (J. E. Radway) discloses use of finely sized particles of alkaline earth carbonates or hydroxides in a water-based slurry. Small percentages (up to 5%) of oil solvents containing "overbased" organic-acid-neutralizing additives added to the slurry are disclosed. It is stated that:

> Although they have been utilized in $SO_3$ capture efforts, there have been no prior reports of their use for capturing either $SO_2$ or toxic metals. Although emissions benefits can be obtained by the use of the so-called 'overbased' compounds, their much higher cost and combustibility make them a less attractive option for most applications. Additionally, the combustibility of the overbased materials requires hard piping as well as additional safety devices, each of which involves increased costs.

Thus, there is a need in the art for a highly reactive oil dispersion having a high flash point for a coal or other fuels used in boilers.

SUMMARY OF THE INVENTION

The present invention provides a method wherein the manufacture of various nanoparticle metal additives can be modified to utilize higher flash point materials. For example in a common method of manufacturing a nanoparticle magnesium overbased material, the reaction is carried out in a high boiling point solvent. After reaction the material is diluted with a lower flash point material that is convenient, has low cost, is readily available, and of course complies with required flash point rules for transport and use in power plants. Substitution instead with additional quantities of the higher boiling point reaction solvent measurably increases the final flash point of the material. As discussed the increase of the flash point would allow the magnesium additive—in this case—to be used nearer the boiler, directly on the coal belt, or other opportune locations without the associated hazards of the lower flash point materials.

The present invention also provides safer high flash point products for use in coal fired boilers or other types of combustion equipment. Since coal fired boilers or any other combustion equipment in which the invention may be used operate at high temperatures, it is important to maintain the highest possible flash point of the combustible materials to avoid or otherwise minimize the danger from fires. Flash point is directly related to vapor pressure of the products. The higher the flash point, the lower the expected vapor pressure of the materials and vice versa. Thus, even if there were a spill or leak, the use of higher flash point products would not result in high solvent vapor pressures. Such vapors can be dangerous as they potentially could travel over distances to where a spark or flame could ignite the vapors. Combustion relies upon fuel, oxygen, and temperature. By minimizing the vapor concentration we are reducing the fuel source. This makes the products of this invention inherently safer to use in the potentially dangerous environments.

The present invention provides a method for conveniently producing fuel products having high flash points.

The present invention also provides a range of additive materials that are much safer than currently available for use in utility and industrial combustion plants.

BRIEF DESCRIPTION OF THE DRAWINGS

The invention can be better understood with reference to the following detailed description together with the appended illustrative drawings in which like elements are numbered the same.

DEFINITIONS USED IN THE INVENTION

The term "high flash point liquid additive" in the context of this invention means a liquid additive having a flash point that is at least about 65° C. so that it is less hazardous around combustion equipment than liquid additives previously available. A liquid additive having a flash point of at least about 70° C. are designed to be safer to use in coal-burning plants. In certain embodiments, liquid additives having a flash point of at least about 70° C. will be referred to as a high flash point liquid additive. It is important to maintain high flash points to avoid or minimize the danger from fires. Flash point is directly related to vapor pressure of the product. The higher the flash point, the lower the vapor pressure of the material. Thus, even after a spill or leak, higher flash point products would not produce high concentrations of vapor that could travel over distances to spark or flame that could ignite them.

The term "mixture" means that two are more components have been mixed together to form a mixture before use.

The term "combination" means that two or more components are used separately and the final composition includes a combination of material made from single components.

DETAILED DESCRIPTION OF THE INVENTION

The inventors have found that by modifying several manufacturing steps it was surprisingly easy to produce materials of higher flash point. This route of easy manufacture is particularly applicable to oil soluble compounds where stability of contained metals is due to Brownian motion and other small particle stability factors. However, other classes of additives could also benefit from this invention.

The present invention relates broadly to a new class of nanomaterial fuel additives including a reaction product between a metal salt and an organic acid in a high boiling (high flash point) solvent, where the organic acid includes between about 6 and about 40 carbon atoms, one or more of the carbon atoms can be replaced by oxygen atoms in the form of ether moieties, nitrogen groups in the form of tertiary amine or amide moieties or mixtures thereof, and where one or more hydrogen atoms can be replaced by fluorine atoms, chlorine atoms or mixtures thereof and where the metal is selected from the group consisting of magnesium, calcium, sodium, potassium, barium, manganese, iron, cerium, copper, zinc, silicon, aluminum, chromium, cobalt, nickel, and mixtures or combinations thereof. The new class of nanomaterial further comprising a secondary active metal material, wherein the secondary active metal material comprises a metal oxide slurry or a magnesium oxide slurry in #2 diesel fuel oil.

Figure 1:
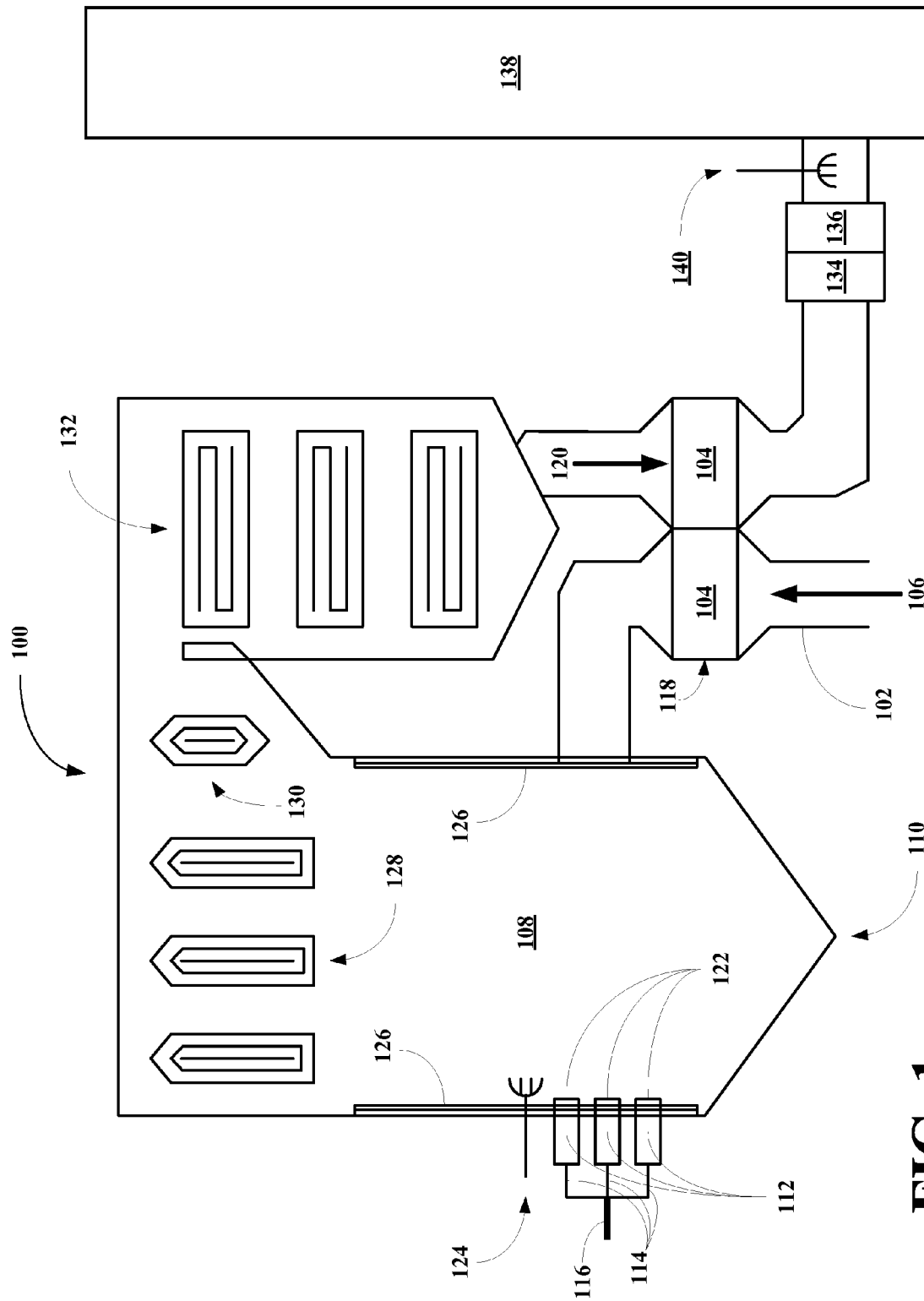
FIG. 1 depicts a typical pulverized coal boiler layout.

Referring to FIG. 1, a combustion apparatus, generally 100, is shown to include a conduit 102 having a preheater 104 through which a combustion air stream 106 is introduced into a boiler firebox 108 of a boiler 110. The boiler 110 also includes pulverized coal burners 112 connected to pulverized coal feed conduits 114 from a pulverized coal supply conduit 116 for supplying a stream of pulverized coal for a pulverized coal supply (not shown). The combustion air stream 106 is pre-heated in the preheater 104 in a heat exchange process 118 with an effluent gas stream 120. At the ends 122 of each burner 112 in the firebox 108 would be burning coal. The arrangement of coal burners 112 may be as shown or on opposite sides of the boiler 110. A high flash point liquid oil-soluble additive of this invention may be introduced into the firebox 108 through a spray apparatus 124 to distribute the material above the burning coal. Combustion gases are used to boil water in water walls 126, superheaters 128 and reheaters 130 to produce steam used in the boiler plant 100 for various functions. The now combusted additive composition will protect these areas as well as economizer 132 and the preheater 104 as these gases pass through those sections. An electrostatic precipitator 134 and a fabric filter 136 remove particulate materials and other contaminants before the exhaust gases 120 are discharged to the atmosphere through a stack 138. In some arrangements, there may also be selective catalytic reduction (SCR) equipment 140 in the area of precipitator 134 and filter 136.

The most common form of filter is a fabric filter. Spray may be applied as a method of removing contaminants from a boiler exhaust by spraying a reagent that interacts with the targeted contaminant to facilitate its removal. The firebox will be the location in the boiler where the primary combustion occurs, where contaminants are freed from their fuel matrix, and where the action of the active metal additives will primarily occur.

Figure 2:
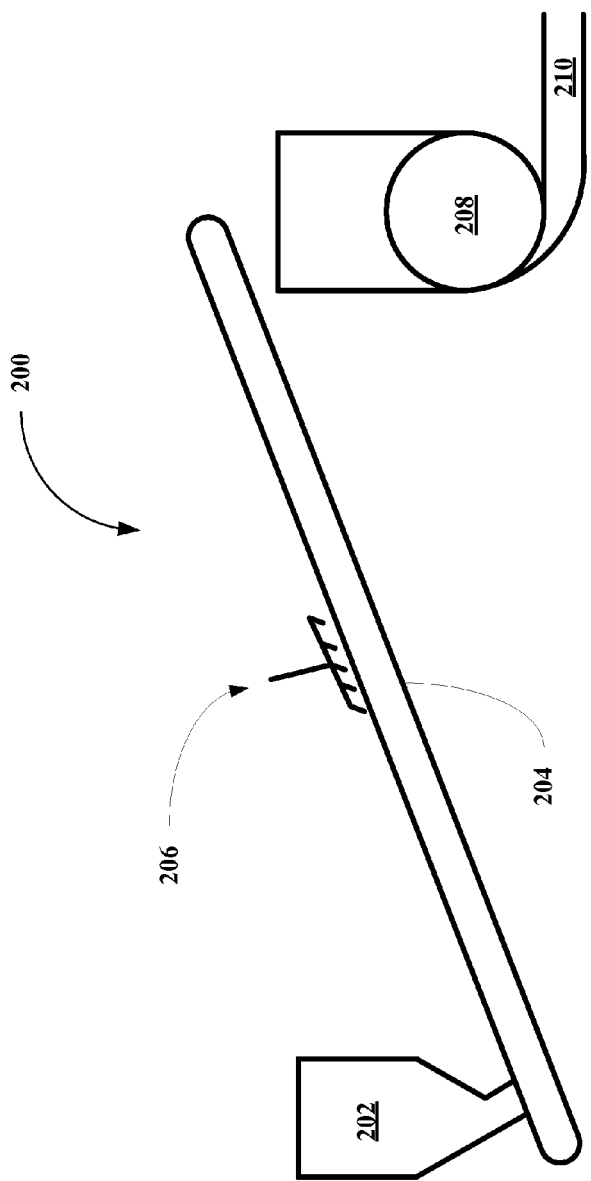
FIG. 2 depicts a sketch of a typical arrangement for spraying a high flash point additive onto a coal belt.

Referring now to FIG. 2, an alternative method for introducing high flash point liquid additives into a coal-burning plant is illustrated, where a combustion apparatus, generally 200, is shown to include a coal hopper 202 that contains the coal that is fed onto a belt 204. The high flash point additive can be spayed onto the coal prior to the coal being dried on the belt due to the high auto ignition temperatures of the additive. The lack of an ignition source and a high flash point provide for increased safety at this stage in the coal plant process. The high flash point liquid additive may be sprayed, dripped, or otherwise conveyed onto the coal through an application apparatus 206. The treated coal is transported to a pulverizer 208, where the coal and the additive are intimately mixed during pulverization. The coal and additive are then conveyed to boiler burners via a feed line or lines 210.

The firebox and beyond into the convective section (superheater and/or reheater) of a boiler are the locations in a boiler where the greatest amounts of slag are generally formed. Slag formation is due to condensation of vaporized and/or molten contaminants onto relatively cooler surfaces of the water tubes and other boiler components. Sulfur dioxide ($SO_2$) is primarily formed in the flame from oil- and coal-borne sulfur materials. The region of the flame, firebox, and normally superheater/reheater are generally too hot kinetically to form appreciable quantities of sulfur trioxide ($SO_3$). The region of a boiler where $SO_3$ formation is thought to occur is where the hot exhaust gases begin to cool as they leave the superheater/reheater and enter the economizer section of the combustion apparatus.

Pulverized coal is coal that is ground to a fine powder before introduction to the firebox of a coal boiler. This is in contrast to lump, cyclone combustion, or grate firing of coal. Each of these methods has a purpose and benefits. Hard piping is not necessary for transport of the additives disclosed here, but for a permanent application hard piping is desired to minimize risk of hoses breaking, loose fittings coming apart, and other possible risks.

Pulverized coal is the targeted fuel for the invention disclosed here, but it should be understood that the application of high flash point liquid additives should not be restricted to only this fuel.

The method of measuring flash point (FP) can be any that is commonly recognized as applicable to liquid- or solvent-containing materials. The American Society for Testing and Materials (ASTM) and other international testing standards groups have specified methods that are acceptable to a broad range of users. For example, ASTM has methods D-56 and D-92 for open cup testing and method D-93 for Pensky-Martens closed cup testing. Similarly IP34, ISO2719, and DIN 51758 are for closed cup testing. For purposes of this invention, the relative terms "low" and "high" are the most important. We are not defining a particular method or temperature that can cover all situations. It is understood there are too many variables for each industry to completely specify either of these parameters. For example, for over the road truck transport, it is often common to use a closed cup method since it is more severe. In other applications the more forgiving open cup method is acceptable. We feel the same and distinguish only "higher" than previously used as the only applicable term. However, we believe ASTM D-93 to be the most widely used method and therefore will recommend that method although absolute values reported are understood to be variable depending on actual flash point method utilized.

Suitable Reagents

Suitable metals for use in this invention include, without limitation, a first group of metals including magnesium, calcium, sodium, potassium, barium, and mixtures or combinations thereof, a second group of metals including manganese, iron, cerium, copper, zinc, and mixtures or combinations thereof, and a third group of metals silicon, aluminum, chromium, cobalt, nickel, and mixtures or combinations thereof, or mixtures or combinations of any one or more of the metals from these three groups.

Suitable high flash point diluents for use in this invention include, without limitation, paraffinic base oils such as Calpar 100 (FP 210° C.), Calpar 325 (FP 240° C.), and Calpar P950 (FP 257° C.) available from Calumet Lubricants Co. of Indianapolis, Ind., any other paraffinic base oils having a flash point of at least 200° C., and mixtures or combinations thereof.

Suitable fuels for use in the present invention include, without limitation, coal (e.g., lignite, sub-bituminous, bituminous, anthracite, graphite, etc.), wood chips, peat, waste oils, biofuels, other solid or liquid fuels, and mixtures or combinations thereof.

The viscosity of the high flash point liquid additive will be in the following ranges: the standard product, having a magnesium content of 30 percent by weight, diluted with low flash point solvent, will have a viscosity of about 150 cSt at 38° C., while dilutions made with several of the high flash point diluents would result in viscosities of 165 cSt at 38° C. with Calpar 100, 180 cSt with Calpar 325 and about 200 cSt with Calpar P950, all at 38° C. and with the same magnesium content. Surprisingly, the viscosity of the additive solution having a high flash point is not greatly higher than the viscosity of presently-used solutions. This result means that flash points at least as high as 257° C. can be attained with high base content liquids and reasonable values of viscosity.

The benefits disclosed here can be noted not only in pulverized coal-fired boilers, but also in oil-fired boilers or boilers using other fuels; for example wood chips, bagasse, waste oils, biofuels, and others.

EXPERIMENTS OF THE INVENTION

Example 1

A suitably sized three neck reaction flask was fitted with stirrer, thermometer, heating source, and condenser system. To this were added first 100 grams of a high boiling solvent such as Calsol 100, 200 grams of a low boiling solvent, and 115 grams of oleic acid. To this stirred solution were then slowly added 472 grams of magnesium hydroxide. Not all of the magnesium hydroxide will necessarily be dissolved at low temperatures, but the magnesium hydroxide should be well dispersed. Heat was then applied to just remove the 200 grams of the low boiling solvent and any water that is formed during the reaction of the magnesium hydroxide and the high boiling solvent and oleic acid and processing. Typically the temperature will need to be raised to about 400° C., but no less than 350° C. Upon cooling, a sufficient amount of the high flash point solvent was added (generally, about 100 grams of Calpar 325) to reduce the magnesium content to about 30.0 wt. %. Upon cooling, about 641 grams of a clear, light colored, magnesium compound was formed. The magnesium product should contain about 30.1 wt. % magnesium determined as the metal.

Example 2

A standard formulation for a nanoparticle magnesium overbase compound was followed. Following the normal dilution the flash point was measured. It was 65° C. using a Pensky Martens Closed Cup method (ASTM D-93). This material had the standard properties associated with this additive.

Example 3

Another standard formulation for a nanoparticle magnesium overbase compound was followed. However, in this case the normal dilution solvent was not used. Instead additional quantities of the high flash point solvent was used. The flash point in this case was increased to 160° C., using again the Pensky Martens Closed Cup method. Most of the standard properties of this material were seen with only a minor increase in product viscosity, still within specifications.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A particulate fuel additive composition comprising a reaction product of an active metal salt and an organic acid and a high boiling solvent and a secondary active metal material comprising a magnesium oxide slurry in #2 diesel fuel oil, where the particles have a particle size below about 200 nm and the composition has a flash point of at least about 65° C.

2. The composition of claim 1, wherein the composition is in the form of a nano organometallic colloidal, suspension or dispersion in the high boiling solvent.

3. The composition of claim 1, wherein the particle size is below about 100 nm.

4. The composition of claim 1, wherein the particle size is below about 50 nm.

5. The composition of claim 1, wherein the particle size is below about 30 nm.

6. The composition of claim 1, further comprising a carbon based fuel.

7. The composition of claim 6, wherein the carbon based fuel is coal.

8. The composition of claim 6, wherein the carbon based fuel is selected from the group consisting of bituminous, sub-bituminous, anthracite, lignite, peat, bagasse, wood chips, other carbon based solid fuels, and mixtures or combinations thereof.

9. The composition of claim 6, wherein the carbon based fuel is a petroleum derived fuel.

10. The composition of claim 1, wherein the flash point is between about 75° C. and about 500° C.

11. The composition of claim 1, wherein the flash point is between about 80° C. and about 450° C.

12. The composition of claim 1, wherein the flash point is between about 100° C. and about 400° C.

13. The composition of claim 1, wherein the flash point is between about 150° C. and about 300° C.

14. The composition of claim 1, wherein the metal of the metal salt is selected from the group consisting of magnesium, calcium, sodium, potassium, barium, manganese, iron, cerium, copper, zinc, silicon, aluminum, chromium, cobalt, nickel, and mixtures or combinations thereof, the organic acid includes between about 6 and about 40 carbon atoms, one or more of the carbon atoms can be replaced by oxygen atoms in the form of ether moieties, nitrogen groups in the form of tertiary amine or amide moieties or mixtures thereof, and where one or more hydrogen atoms can be replaced by fluorine atoms, chlorine atoms or mixtures thereof, and the high boiling solvent comprises a paraffinic base oil or a mixture of paraffinic base oils.

15. The composition of claim 1, wherein the metal of the metal salt is selected from the group consisting of magnesium, calcium, sodium, potassium, barium, and mixtures or combinations thereof, the organic acid includes between about 6 and about 40 carbon atoms, one or more of the carbon atoms can be replaced by oxygen atoms in the form of ether moieties, nitrogen groups in the form of tertiary amine or amide moieties or mixtures thereof, and where one or more hydrogen atoms can be replaced by fluorine atoms, chlorine atoms or mixtures thereof, and the high boiling point solvent is selected from the group consisting of paraffinic base oils having a flash point of at least 200° C., and mixtures or combinations thereof.

16. The composition of claim 1, wherein the composition includes a metal concentration between about 15 wt. % and about 45 wt. %.

17. The composition of claim 1, wherein the particles have a mean particle size between about 20 and about 80 nanometers.

* * * * *